May 12, 1970  H. SIMON  3,511,148

FLASH MECHANISM

Filed July 12, 1967

HORST SIMON
INVENTOR

BY
Ronald S Clauson
Robert W Hampton
ATTORNEYS

HORST SIMON
INVENTOR

BY
Ronald S. Hanlon
Robert W. Hampton
ATTORNEYS

United States Patent Office 3,511,148
Patented May 12, 1970

3,511,148
FLASH MECHANISM
Horst Simon, Fellbach, near Stuttgart, Germany, assignor to Eastman Kodak Company, Rochester, N.Y., a corporation of New Jersey
Filed July 12, 1967, Ser. No. 652,875
Claims priority, application Germany, Aug. 5, 1966, K 55,202
Int. Cl. G03b *19/00*
U.S. Cl. 95—11                           8 Claims

ABSTRACT OF THE DISCLOSURE

A flash unit having a socket and mechanism by which flash bulbs of a multilamp attachment are advanced to an operative position through a rotary drive mechanism. The unit also functions with an adapter as a mount for conventional non-rotary flash bulbs. The unit has a coupling member located between the rotary drive mechanism and the rotary flash socket for disconnecting the drive mechanism from the socket in response to insertion of a non-rotary adapter into the socket. The non-rotary adapter has a central extension thereon which engages a pin element of the coupling member to disconnect the drive mechanism from the socket upon insertion of the adapter into the socket.

---

The invention generally relates to flash units for photographic cameras and more specifically to flash units that have rotary drive mechanisms for multilamp flash attachments.

Flash units employing rotatable flash attachments containing a plurality of lamps or bulbs, such as flashcubes, are known in the art. Such devices employ a drive mechanism to rotate the flash attachment to sequentially orient the lamps of the attachment to a lamp synchronizing circuit upon operation of a camera mechanism such as advancement of film. Also known are flash cameras that employ single bulb attachments in which the bulbs are replaced after each flash. The latter type of bulb is conventionally provided with a glass and/or bayonet base for individual attachment and, of course, does not require a drive mechanism as may be used in the plural bulb rotary attachment.

The present invention comprises a flash unit having a lamp socket arrangement capable both of connecting with a drive mechanism to provide rotation of a plural bulb attachment and of acting as an adapter for a single bulb with a glass and/or bayonet base, wherein, when the device is used with the latter type of bulb, the rotary drive mechanism is disconnected.

In accordance with a preferred form of the invention, the flash unit includes means for disconnecting the drive mechanism for the movable attachment either automatically upon insertion of the single bulb adapter or manually through operation of a disconnecting lever. The disconnecting means includes engaging means associated with the drive mechanism for engaging a socket mount for both a rotatable attachment or an adapter for a single bulb of the type described. When a rotatable attachment is used the engaging means engages the socket mount to cause rotation of the socket and attachment. When a single bulb is to be used, the engaging means is caused to move out of contact with the socket mount manually or when the flash adapter is attached, thereby to disengage the drive mechanism coupling means.

The invention as well as objects and advantages thereof will become more apparent from the following description, reference being made to the accompanying drawings, wherein.

Figure 1:
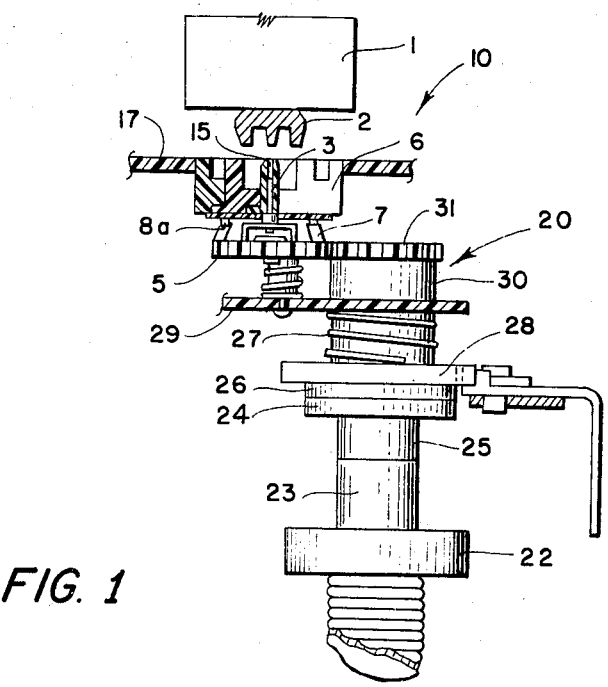
FIG. 1 is a partially sectioned view of the flash unit and the rotary drive mechanism therefor.

In FIG. 1 the invention is shown as incorporated in a photographic camera which includes a flash unit assembly generally designated by the numeral 10 and a drive mechanism generally designated by the numeral 20. Drive mechanism 20 includes a film drive spool 22, constituting a portion of the usual film advancing mechanism, which is mounted for rotational movement in the camera housing in a conventional manner (not shown). Rotation of a conventional film winding lever (not shown) causes drive spool 22 to rotate so that the exposed film is moved onto the spool and an unexposed frame is advanced to the exposure position in the usual manner. Rigidly secured at the top of the drive spool 22 is an elongated member 23 which is connected to a first shaft 25. Shaft 25 has rigidly attached thereto a clutch plate 24 and a clutch disc 26. The clutch disc 26 is affixed to clutch plate 24 by any suitable means such as glue. An escapement disc 28 is urged into frictional engagement with clutch disc 26 by the biasing action of a compression spring 27 which surrounds a second shaft 30 and is disposed between and bears against the escapement disc 28 and a mounting plate 29. Escapement disc 28 is rigidly attached to one end of a second shaft 30 which extends through mounting plate 29 and which has a pinion 31 rigidly fixed to its other end. Pinion 31 drives a rotatable flash socket drive means shown here as a driven gear 5.

Figure 2:
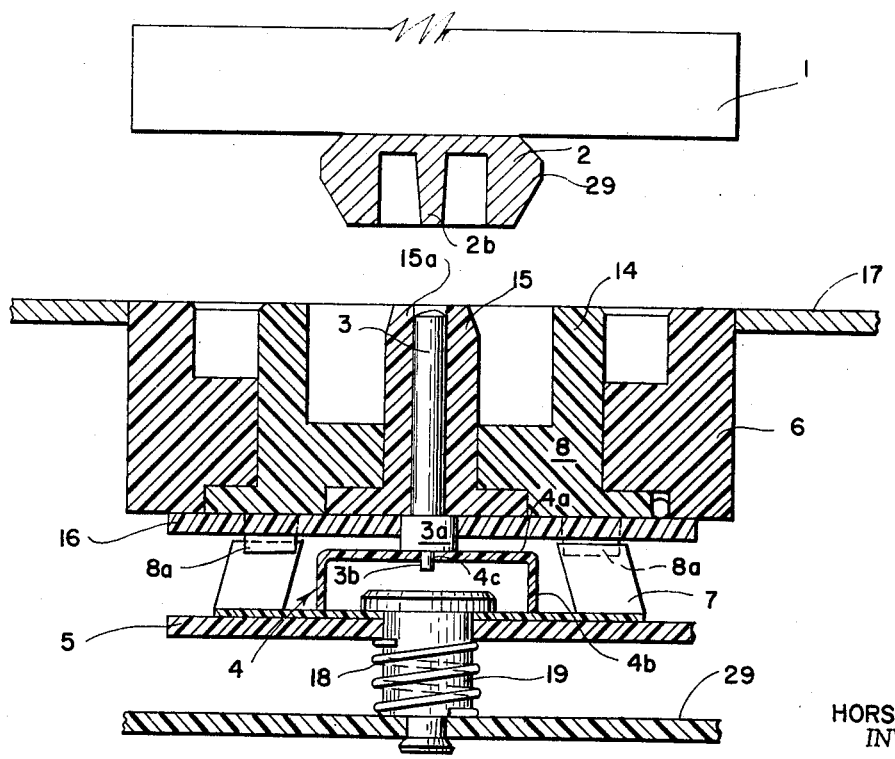
FIG. 2 is a detailed sectional view of an embodiment of the flash unit wherein automatic disconnection of the coupling is effected.
Figure 3:
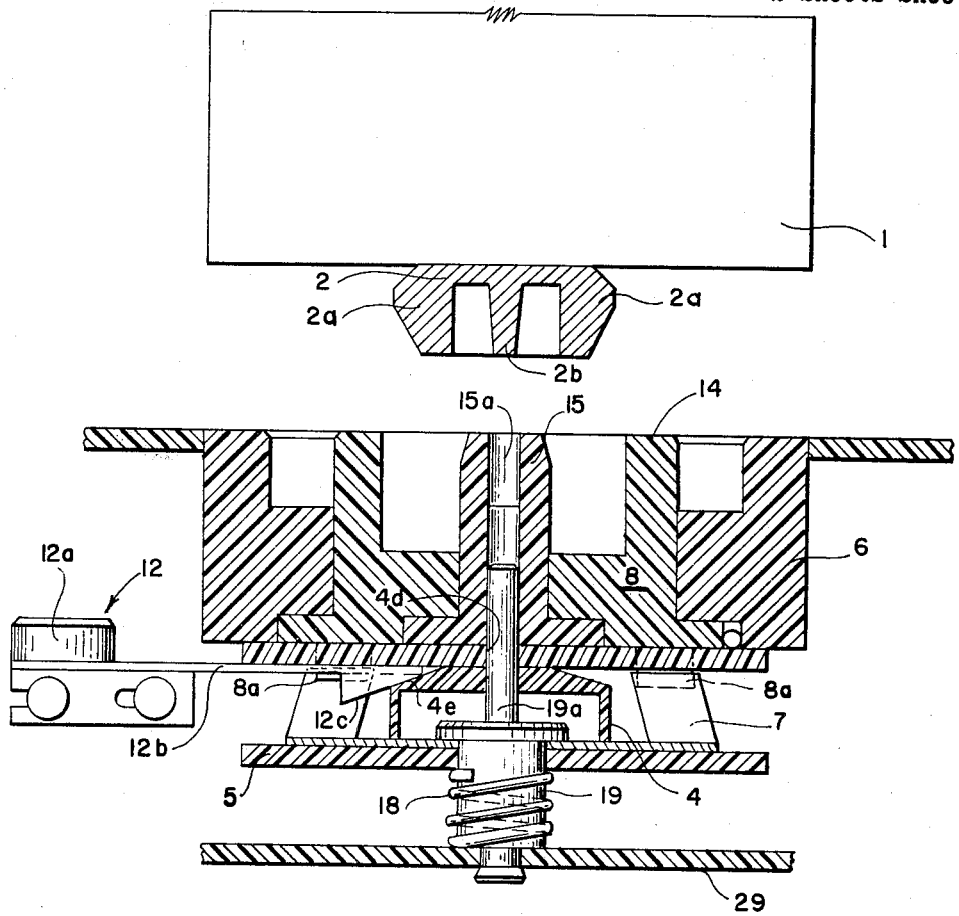
FIG. 3 is a detailed sectional view of the device according to the invention wherein manual disconnection means are shown.

The flash unit assembly, best seen in FIGS. 2 and 3 (similar elements being given the same reference numerals), comprises a socket means 8 used to mount a flash attachment such as a flashcube or an adapter 1. The adapter 1 which will be described in more detaile hereinbelow permits the use of conventional flash bulbs in a flash unit adapted for the use of rotatable flash attachments. Socket means 8, which generally comprises a central flashcube-centerpost retaining member 14, guide member or stabilizing post 15, a ring member 6 and a disc member 16 (see FIG. 2), is rotatably mounted in a camera housing 17. It is noted that the socket means 8 is not limited to such a mounting and could, for example, be mounted in a separate flash unit housing. Central member 14, guide member 15, ring member 6 and disc member 16 are fixedly connected to one another by any suitable means so that these elements rotate as a unit. Socket means 8 is provided with downwardly extending projections 8a which pass through openings in member 16 and co-act with upwardly extending members 7 affixed to rotatable drive gear 5. Projections 8a of socket means 8 engage members 7 of drive gear 5 so that the flash unit will rotate upon rotation of gear 5. However, projections 8a and engaging mmebers 7 may be separated by moving gear 5 in a downward direction to a position wherein engaging members 7 are out of contact with projections 8a. To achieve this purpose, drive gear 5 is journalled on a stud 19 and is capable of axial movement in a longitudinal direction thereon, i.e., downwardly along the length of stud 19 against the biasing action of a compression spring 18. Stud 19 is rotatably mounted in mounting plate 29 while spring 18 is disposed between and bears against drive gear 5 and mounting plate 29.

In the embodiment of FIG. 2, in which automatic release of drive mechanism 5 is provided, the flash unit 10 further includes a pin member 3 slidably disposed in a bore in guide member 15 of socket means 8. A coupling member 4, disposed between socket means 8 and unit drive mechanism 5, is of single-piece construction and comprises a disc-shaped upper portion 4a whose surface bears against an enlarged base portion 3a of pin member 3 and an annular-shaped base portion 4b whose edge bears against the upper surface of drive mechanism 5. Coupling member 4 is retained in position between socket means 8 and drive means 5 by a locating projection 3b of pin 3 which extends through a hole 4c in the upper surface 4a of coupling member 4.

In the embodiment of FIG. 3 in which manual release of unit drive mechanism 5 is provided, similar elements have the same reference numerals. Stud 19 is provided with an extension portion 19a which extends through a hole 4d in coupling member 4, into the guide member 15 of socket means 8 and thus serves to locate coupling member 4 with respect to socket means 8 and drive gear 5. The coupling means 4 is provided with a slanted cam surface 4e formed on its upper surface 4a. The upper surface 4a bears against disc member 16 of socket means 8. The manual relelease mechanism generally designated by the numeral 12 comprises a shaft member 12b having an accessible handle member 12a at one end thereof and a slanted cam surface 12c at the opposite end. Release mechanism 12 is attached to the camera housing by suitable means (not shown) and is capable of longitudinal movement in a direction parallel to shaft 12b. Cam surface 12c is adapted to co-act with cam surface 4e so that when shaft member 12 is moved inwardly coupling means 4 and drive gear 5 are forced downwardly against the bias of spring 18. Release member 12 is shown, however, partially in schematic to depict the principle. In practice, it may be desirable to extend the length of movement of member 12 such that, in its rest position as shown in FIG. 3, cam surface 12c would clear projections 8a and members 7 during rotation thereof. When the drive means is disconnected by moving member 12 to the right (FIG. 3) projection 7 will rotate clear of shaft 12b.

Figure 4:
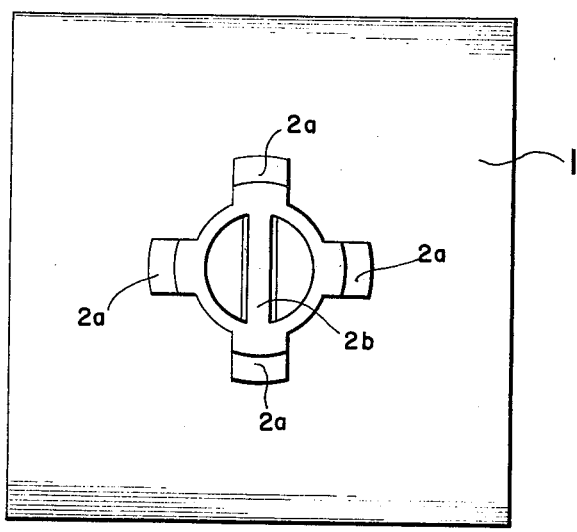
FIG. 4 is a bottom view of the adapter of FIGS. 1 to 3.

The flash unit adapter 1, best seen in FIGS. 2–4, includes a depending connecting base portion 2 which includes four radial projections 2a as a flashcube base. In addition, however, base portion further includes a central extension 2b. When adapter 1 is mounted on socket means 8, central extension 2b slidably extends into guide member 15 while radial projections 2a are disposed within corresponding recesses in central member 14 in a known manner. An upper portion 15a of guide member 15 is formed as a slot which co-acts with the central extension 2b (see FIG. 4) of base 2 to position the adapter 1 correctly. The remainder of the flash adapter 1 may comprise any known flash bulb socket and reflector unit as known in the art. Such an adapter is shown in German Gebrauchsmuster No. 1,938,482.

The invention as incorporated in the embodiment of FIG. 2 operates as follows: When a rotatable flash attachment such as a flashcube (not shown) is used, rotation of the flash attachment is achieved through the action of camera drive mechanism 20. Actuation of the film winding lever (not shown) causes rotation of film spool 22 and associated elongated member 23, shaft 25, clutch plate 24 and clutch disc 26. This rotational movement is transferred from clutch disc 26 through escapement disc 28, with which it is in frictional engagement, to second shaft 30 and associated pinion 31 which in turn drives flash unit drive mechanism 5. Rotation of flash unit driving mechanism 5 causes rotation of socket means 8 in housing 17 as well as rotation of the flashcube disposed in socket means 8 so that each bulb of the flashcube may be advanced sequentially to its operating position. When it is desired to change over to a single bulb of the type having a glass and/or bayonet base, the adapter 1 is used as a mount for the bulb. When adapter 1 is fitted into socket means 8 central extension 2b of the adapter 1 forces pin member 3 and coupling member 4 in a downward direction as viewed in FIG. 2 generally perpendicular to the plane of rotation of socket means 8. The lower edge of base portion 4a of coupling member 4 bears against the upper surface of drive gear 5 to cause a downward movement thereof against the biasing action of spring 18 to move engaging members 7 of drive gear 5 out of contact with projections 8a of socket means 8, thereby disengaging the entire rotary drive mechanism 20. Thus disengagement of drive mechanism 20 is effected automatically upon the mounting of adapter 1 into socket means 8.

In the embodiment of FIG. 3, manual disconnection is effected through the actuation of handle means 12a of actuating means 12. Longitudinal displacement of handle means 12a to the right as viewed in FIG. 3 causes cam surface 12c to co-act with the reciprocally shaped slanted cam surface 4e of coupling member 4 to force the coupling member 4 in a downward direction. As in the embodiment of FIG. 3, movement of the coupling member in the downward direction causes disconnection of the engaging members 7 of drive mechanism 5 from the projection 8a of socket member 8 and thus disconnection of the entire driving mechanism 20.

It should be noted that the drive mechanism could take other forms than drive gear 5 and further that the drive mechanism could be connected to camera mechanisms such as shutter release means for the camera or an electric and/or mechanical means for performing camera setting operations.

It will be understood by those skilled in the art that the embodiments of the invention shown and described herein are subject to modification without departing from the scope and spirit of the invention. Accordingly, it should be understood that the invention is not limited by the embodiments shown and described, but rather is defined by the subjoined claims.

I claim:

1. In a flash unit for a camera which camera includes means for receiving a rotatable multilamp flash attachment and means for rotating said attachment, the improvement comprising
    socket means rotatably mounted in said camera for receiving selectively a multilamp flash attachment or a non-rotary flash unit,
    engaging means for operatively interconnecting the rotating means with the socket means, and
    means for disconnecting said engaging means in response to insertion of a non-rotary unit in said socket means.

2. A flash unit for a camera for selectively receiving a rotatable multilamp flash attachment or a non-rotary flash adapter for individual flash bulbs, said unit comprising,
    socket means rotatably mounted in the camera for selectively receiving a multilamp flash attachment or a non-rotary flash adapter,
    drive means mounted in the camera for rotating said socket,
    said drive means including means for engaging said socket to rotate said socket in response to the drive means, said drive means being mounted for movement to an inoperative position wherein said engaging means is disconnected from said socket, and
    means for moving said drive means and engaging means to the inoperative position in response to insertion of a non-rotary bulb adapter.

3. A flash unit according to claim 2 wherein said moving means comprises a pin slidable in said socket and actuated by means on a non-rotary flash adapter to move the drive means and engaging means to the inoperative position automatically upon insertion of the non-rotary flash adapter.

4. A flash unit according to claim 3 wherein said socket means includes guide means and said means on said adapter compises a central extension which further co-acts with said guide means to locate the adapter in a predetermined position.

5. A flash unit according to claim 2 wherein said moving means comprises cam means to shift the drive means and engaging means between operative and inoperative positions and wherein said drive means is rotatable and said engaging means comprises downward extending projections on said socket, upwardly extending engaging members mounted on said drive means, biasing means for biasing said drive means upwardly toward said socket to thereby position said engaging members in contact with said projections to rotate said socket upon rotation of said drive means, and coupling means disposed between said socket and said drive means, said coupling means including a disc-shaped upper portion and an annular-shaped base portion, the lower edge of said annular-shaped portion bearing against said drive means, the upper surface of said disc-shaped upper portion including a flat upper surface and a slanted cam surface, said flat upper surface bearing against said socket means; and wherein said cam means comprises a movable shaft and means located at one end of said shaft having a slanted cam surface thereon co-acting with the cam surface of said coupling means to move said coupling member against the biasing spring to move said engaging members on said driving means out of contact with said projections on said socket means whereby said socket remains stationary upon rotation of said drive means.

6. A flash unit comprising in combination:
- a separable non-rotary adapter receiving individual flash bulbs, the adapter having a center extension,
- rotatable socket means for mounting a multilamp flash attachment for rotation therewith and for mounting the adapter, said socket means having downwardly extending projections on the bottom extremity thereof,
- rotary drive means,
- upwardly extending engaging means mounted on said drive means,
- biasing means for biasing said drive means upwardly toward said socket means to position said engaging means in contact with said projections on said socket means to rotate said socket means upon rotation of said drive means,
- coupling means disposed between said socket means and said drive means,
- pin means located in a bore in said socket means, said pin means bearing against said coupling means, the pin means being responsive to the central extension of said adapter upon mounting of said adapter in said socket means to cause the coupling means to move said rotary drive means downward against the biasing means to disengage said engaging means from said projections on said socket means, said socket means and mounted adapter thereby remaining stationary during rotation of said drive means.

7. A flash unit according to claim 6 wherein said coupling means comprises a disc-shaped upper portion and an annular-shaped base portion, the lower edge of said annular-shaped portion bearing against said rotary drive means.

8. A flash unit according to claim 6 wherein said pin means includes a projection for retaining said coupling means in its position between said drive means and said socket means.

References Cited
UNITED STATES PATENTS

| | | | |
|---|---|---|---|
| 3,335,651 | 8/1967 | Williams et al. | 95—11 |
| 3,357,329 | 12/1967 | Nerwin | 95—11 |
| 3,374,720 | 3/1968 | Harvey | 95—11.5 |

NORTON ANSHER, Primary Examiner

F. L. BRAUN, Assistant Examiner

U.S. Cl. X.R.

240—1.3, 37.1